US011397551B2

(12) United States Patent
Ma et al.

(10) Patent No.: US 11,397,551 B2
(45) Date of Patent: Jul. 26, 2022

(54) METHOD FOR DETERMINING OFFSET DISTANCE OF SPLICING SCREEN AND RELATED APPARATUS

(71) Applicant: BOE TECHNOLOGY GROUP CO., LTD., Beijing (CN)

(72) Inventors: Xitong Ma, Beijing (CN); Yangyang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 326 days.

(21) Appl. No.: 16/612,548

(22) PCT Filed: Sep. 28, 2018

(86) PCT No.: PCT/CN2018/108337
§ 371 (c)(1),
(2) Date: Nov. 11, 2019

(87) PCT Pub. No.: WO2020/062025
PCT Pub. Date: Apr. 2, 2020

(65) Prior Publication Data
US 2021/0357170 A1 Nov. 18, 2021

(51) Int. Cl.
*G06F 3/14* (2006.01)
*G09G 3/20* (2006.01)

(52) U.S. Cl.
CPC .......... *G06F 3/1446* (2013.01); *G06F 3/1431* (2013.01); *G09G 3/20* (2013.01); *G09G 2310/0275* (2013.01)

(58) Field of Classification Search
CPC .. H04N 9/3185; H04N 9/3194; H04N 9/3147; H04N 5/2252; H04N 9/31;
(Continued)

(56) References Cited

U.S. PATENT DOCUMENTS 9,007,279 B2 * 4/2015 Calvo Alonso .......... G09G 5/02
345/1.3
2007/0285663 A1 * 12/2007 Hewitt ................. H04N 13/346
356/399
(Continued)

FOREIGN PATENT DOCUMENTS

CN 101324824 A 12/2008
CN 102096577 A 6/2011
(Continued)

OTHER PUBLICATIONS

PCT International Search Report, Application No. PCT/CN2018/108337, dated Jun. 27, 2019, 7 pages: with English translation.
(Continued)

*Primary Examiner* — Duc Q Dinh
(74) *Attorney, Agent, or Firm* — Armstrong Teasdale LLP

(57) ABSTRACT

Embodiments of the present disclosure relate to a method for determining an offset distance of a splicing screen in a multi-screen display system, a method for driving the multi-screen display system, and a related control apparatus. In the method for determining the offset distance of the splicing screen, a preset image is displayed in each of a plurality of splicing screens of the multi-screen display system. A feature point is determined in the preset image, and a position of the feature point of each splicing screen in the multi-screen display system is determined. Based on the positions of the feature points, at least one of a vertical offset distance and a horizontal offset distance of each splicing screen is determined.

18 Claims, 7 Drawing Sheets

(58) Field of Classification Search
CPC ............ G09G 2320/0693; G09G 5/14; G09G 2300/026; G09G 3/002; G09G 2320/08; G09G 2340/0457; G09G 2340/0464; G09G 2310/0275; G09G 3/20; G09G 2356/00; G09G 2360/145; G09G 5/32; G06F 3/1446; G06F 3/14; G06F 3/1431; G06F 3/04886; G06F 1/3218; E04H 17/04; E04H 17/06; G09F 9/3026
USPC ............................................ 345/1.1–1.3, 1.2
See application file for complete search history.

(56) References Cited

U.S. PATENT DOCUMENTS

| | | | |
|---|---|---|---|
| 2009/0251393 A1 | 10/2009 | Fan | |
| 2011/0210979 A1* | 9/2011 | Furui | G03B 21/005 |
| | | | 345/619 |
| 2017/0192733 A1* | 7/2017 | Huang | G06F 3/1431 |

FOREIGN PATENT DOCUMENTS

| | | |
|---|---|---|
| CN | 104132621 A | 11/2014 |
| CN | 105304002 A | 2/2016 |
| CN | 105468326 A | 4/2016 |
| CN | 105824593 A | 8/2016 |

OTHER PUBLICATIONS

PCT Written Opinion, Application No. PCT/CN2018/108337, dated Jun. 27, 2019, 5 pages.: with English translation of relevant part.

* cited by examiner

METHOD FOR DETERMINING OFFSET DISTANCE OF SPLICING SCREEN AND RELATED APPARATUS

CROSS REFERENCE TO RELATED APPLICATIONS

This patent application is a National Stage Entry of PCT/CN2018/108337 filed on Sep. 28, 2018, the disclosure of which is incorporated by reference herein in its entirety as part of the present application.

BACKGROUND

The present disclosure relates to display technology, and more particularly relates to a method for determining an offset distance of a splicing screen in a multi-screen display system, a method for driving the multi-screen display system, a related control apparatus, and the multi-screen display system.

Currently, a large-sized image is desired to be displayed for many systems such as traffic management, video monitor, video conference, etc., but it is difficult for a conventional-sized display screen to meet this requirement. Therefore, a multi-screen display system has been proposed to display the large-sized image. Generally, the multi-screen display system is constructed by physically splicing a plurality of display screens (also referred to "splicing screens") to implement single-screen display or multi-screen display.

BRIEF DESCRIPTION

Embodiments of the present disclosure provide a method for determining an offset distance of a splicing screen in a multi-screen display system and a related control apparatus.

A first aspect of the present disclosure provides a method for determining an offset distance of a splicing screen in a multi-screen display system. The multi-screen display system includes a plurality of splicing screens arranged in a matrix. In the method, a preset image is displayed in each of the plurality of splicing screens. Then, a feature point is determined in the preset image, and, for each splicing screen, a position of the feature point in the multi-screen display system is determined. Further, for each splicing screen, at least one of a vertical offset distance and a horizontal offset distance is determined based on the positions of the feature points.

In an embodiment of the present disclosure, determining the vertical offset distance for each splicing screen based on the positions of the feature points may include selecting a first reference display screen from each row of the splicing screens, determining, for each of the row of the splicing screens, a vertical offset of the position of the feature point of the splicing screen relative to the position of the feature point of the first reference display screen, and determining, based on the vertical offset, a vertical pixel distance of the splicing screen relative to the first reference display screen as the vertical offset distance.

In an embodiment of the present disclosure, the vertical offset may be determined by calculating a difference between a vertical coordinate of each feature point of each row of the splicing screens and a vertical coordinate of the feature point of the corresponding first reference display screen.

In an embodiment of the present disclosure, determining the horizontal offset distance for each splicing screen based on the positions of the feature points may include selecting a second reference display screen from each column of the splicing screens, determining, for each of the column of the splicing screens, a horizontal offset of the position of the feature point of the splicing screen relative to the position of the feature point of the second reference display screen, and determining, based on the horizontal offset, a horizontal pixel distance of the splicing screen relative to the second reference display screen as the horizontal offset distance.

In an embodiment of the present disclosure, the horizontal offset may be determined by calculating a difference between a horizontal coordinate of each feature point of each column of the splicing screens and a horizontal coordinate of the feature point of the corresponding second reference display screen.

In an embodiment of the present disclosure, determining the vertical offset distance for each splicing screen based on the positions of the feature points may include determining, for each row of the splicing screens, vertical offsets between the positions of the feature points of the adjacent splicing screens, determining the vertical pixel distances between the adjacent splicing screens based on the vertical offsets, and determining a vertical pixel distance of each of the row of the splicing screens relative to the first reference display screen as the vertical offset distance, based on the vertical pixel distances between adjacent splicing screens, wherein the first reference display screen is one of the row of the splicing screens.

In an embodiment of the present disclosure, the vertical offset may be determined by calculating a difference between vertical coordinates of the feature points of the adjacent splicing screens.

In an embodiment of the present disclosure, determining the horizontal offset distance for each splicing screen based on the positions of the feature points may include determining, for each column of the splicing screens, horizontal offsets between the positions of the corresponding feature points of the adjacent splicing screens, determining horizontal pixel distances between the adjacent splicing screens based on the horizontal offsets, and determining the horizontal pixel distance of each of the column of the splicing screens relative to a second reference display screen as the horizontal offset distance, based on the horizontal pixel distances between the adjacent splicing screens, wherein the second reference display screen is one of the column of the splicing screens.

In an embodiment of the present disclosure, the horizontal offset may be determined by calculating a difference between horizontal coordinates of the feature points of the adjacent splicing screens.

In an embodiment of the present disclosure, the preset image may be one of the following images: a cross line pattern formed by intersection of line segments which are parallel to two adjacent edges of the splicing screen respectively; a first line pattern in parallel with a row direction of the matrix of the splicing screens; and a second line pattern in parallel with a column direction of the matrix of the splicing screens.

In an embodiment of the present disclosure, the preset images may include a first preset image and a second preset image. Further a first feature point may be determined in the first preset image to determine the vertical offset distances of the splicing screens, and a second feature point may be determined in the second preset image to determine the horizontal offset distances of the splicing screens.

In an embodiment of the present disclosure, the first preset image may be a first line pattern in parallel with a row direction of the matrix of the splicing screens, and wherein the second preset image may be a second line pattern in parallel with a column direction of the matrix of the splicing screens.

A second aspect of the present disclosure provides a method for driving a multi-screen display system. The multi-screen display system includes a plurality of splicing screens arranged in a matrix. In the method, a data signal for driving each of the plurality of the splicing screens is adjusted based on a vertical offset distance and/or a horizontal offset distance of the splicing screen, wherein the vertical offset distance and/or the horizontal offset distance are determined using the method according to the first aspect of the present disclosure. Then, the splicing screen is driven with the adjusted data signal.

In an embodiment of the present disclosure, the method may further include causing, for each of the splicing screens, a number of pixel rows corresponding to the vertical offset distance to display in black based on the vertical offset distance, wherein the pixel rows are located at an edge of the splicing screen in the same direction as an offset direction of the vertical offset distance, and/or causing, for each of the splicing screens, a number of pixel columns corresponding to the horizontal offset distance to display in black based on the horizontal offset distance, wherein the pixel columns are located at an edge of the splicing screen in the same direction as an offset direction of the horizontal offset distance.

A third aspect of the present disclosure provides a control apparatus for a multi-screen display system. The multi-screen display system includes a plurality of splicing screens arranged in a matrix. The control apparatus includes one or more processors and a memory coupled to one or more the processors and having computer program instructions stored therein, wherein the computer program instructions are configured to, when executed by the one or more processors, cause the control apparatus to perform the method according to the first aspect of the present disclosure to determine a vertical offset distance and/or a horizontal offset distance for each of the splicing screens.

In an embodiment of the present disclosure, wherein the computer program instructions may be further configured to, when executed by the one or more processors, cause the control apparatus to adjust a data signal for driving each of the splicing screens based on the vertical offset distance and/or the horizontal offset distance of the splicing screen, and driving the splicing screen with the adjusted data signal.

A fourth aspect of the present disclosure provides a multi-screen display system. The multi-screen display system includes a plurality of splicing screens arranged in a matrix, and the control apparatus according to the third aspect of the present disclosure, coupled to the plurality of splicing screens.

BRIEF DESCRIPTION OF THE DRAWINGS

In order to illustrate the technical solutions of the embodiments of the present disclosure more clearly, drawings of the embodiments will be briefly described below. It should be appreciated that the drawings described below only relate to some embodiments of the present disclosure, rather than limiting the present disclosure, wherein throughout each one of these drawings, corresponding reference numerals indicate corresponding parts or features.

DETAILED DESCRIPTION

Figure 1:
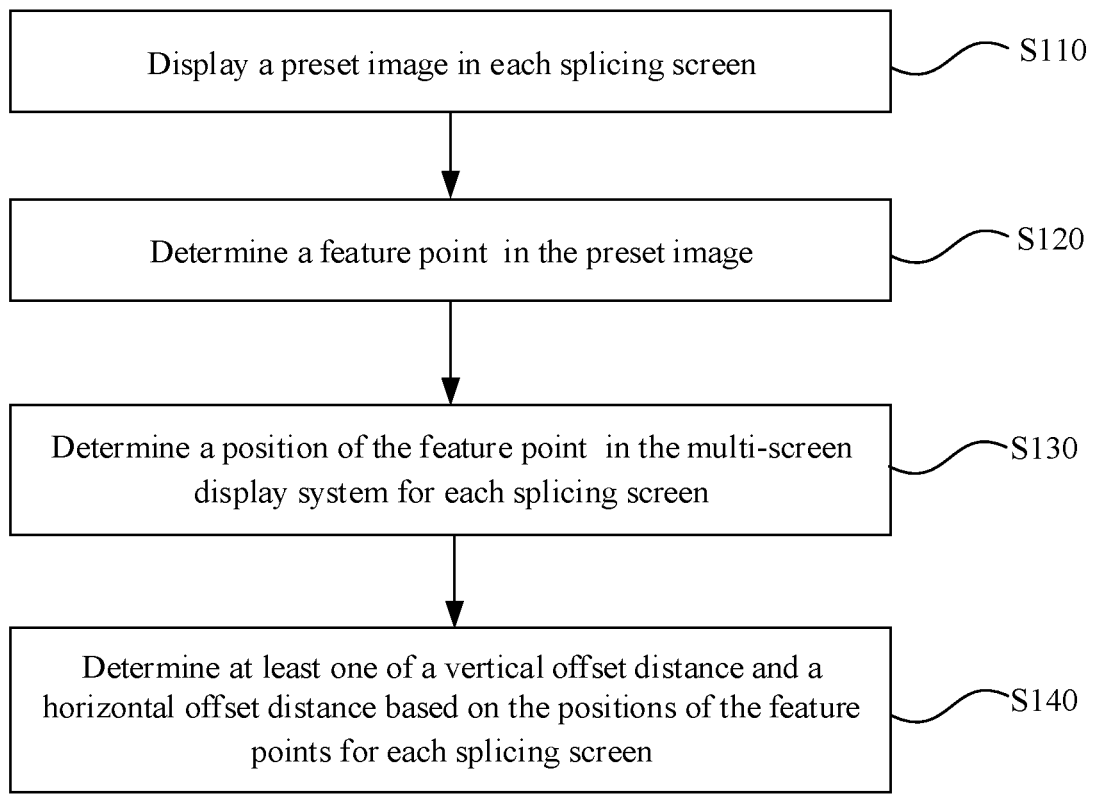
FIG. 1 is a schematic flow chart of a method for determining an offset distance of a splicing screen in a multi-screen display system according to some embodiments of the present disclosure.

In order to make the technical solutions and advantages of the embodiments of the present disclosure more clear, the technical solutions in the embodiments of the present disclosure will be clearly and completely described below in detail, in conjunction with the drawings. Obviously, the described embodiments are merely some but not all of embodiments of the present disclosure. Based on the described embodiments of the present disclosure, all other embodiments obtained by those skilled in the art without creative work shall fall within the protecting scope of the present disclosure.

The terms "a", "one", "this" and "the" are intended to mean the presence of one or more elements when introducing elements and their embodiments of the present disclosure. The terms "comprising", "including", "containing" and "having" are intended to be inclusive and to indicate that there may be additional elements other than the listed elements. The terms "first", "second", "third", etc. are merely employed to distinguish one component (or a portion of the component) from another component (or another portion of the component) for purposes of description, and should not be appreciated as indicating or implying a relative importance and the order of formation. The flow chart depicted in the present disclosure is merely an example. There may be many variations of the flowchart or the steps described therein without departing from the spirit of the disclosure. For example, the steps may be performed in a different order, or the steps may be added, deleted, or modified. These variations shall be considered to be a part of what desired to claim.

For the purpose of the description below, as the indicated direction shown in the drawings, the terms "up", "down", "left", "right", "vertical", "horizontal", "top", "bottom" and their derivatives are involved in the present disclosure. The terms "overriding", "on the top of", "positioned over" or "positioned on the top of" means that a first element such as a first structure is on a second element such as a second structure, wherein there may be intermediate elements such as interface structures between the first element and the second element. The term "contact" means connecting the first element such as the first structure and the second element such as the second structure, and there may be other elements or nothing on the interface of the two elements.

Unless otherwise defined, all terms (including technical and scientific terms) used herein have the same meanings as commonly understood by those skilled in the art to which the subject matter of the present disclosure belongs. It will be further understood that terms, such as those defined in commonly used dictionaries, should be interpreted as having the meanings that are consistent with their meanings in the context of the specification and the related art and will not be interpreted in an idealized or overly formal sense unless expressly so defined herein. As employed herein, the description of "connecting" or "coupling" two or more parts together should refer to the parts being directly combined together or being combined via one or more intermediate components.

Currently, there are a splice error for the multi-screen display system formed in a physical splicing way. Therefore, when displaying an image on the multi-screen display system, especially a high-speed motion image, the images displayed on the splicing screens may not be aligned with each other, thereby affecting the display effect. In order to solve this technical problem, embodiments of the present disclosure provide solutions for determining such tiling error to correct the display of the image, thereby compensating for the tiling error and improving the display effect.

FIG. 1 shows a schematic flow chart of a method for determining an offset distance of a splicing screen in a multi-screen display system according to some embodiments of the present disclosure. In some embodiments of the present disclosure, the multi-screen display system may include a plurality of splicing screens arranged in a M×N matrix.

As shown in FIG. 1, at step S110, a preset image is displayed in each splicing screen. In some embodiments of the present disclosure, the preset image may be any pattern such as a cross line pattern, a horizontal line pattern, or a vertical line pattern, etc. Optionally, the preset image displayed in each splicing screen may be the same. At step S120, the feature point is determined in the preset image. In some embodiments of the disclosure, the feature point may be used as a reference point for determining the offset distance and may be any point in the preset image. At step S130, the position of the feature point in the multi-screen display system is determined for each splicing screen. In some embodiments of the disclosure, a rectangular coordinate system may be established for the multi-screen display system. Thus, the positions of the feature points in the multi-screen display system may be represented by the corresponding coordinates. Then, at step S140, at least one of a vertical offset distance and a horizontal offset distance is determined based on the positions of the feature points for each splicing screen.

The process of determining the offset distance for the splicing screen as shown in FIG. 1 will be described in detail below with two examples.

Figure 2:
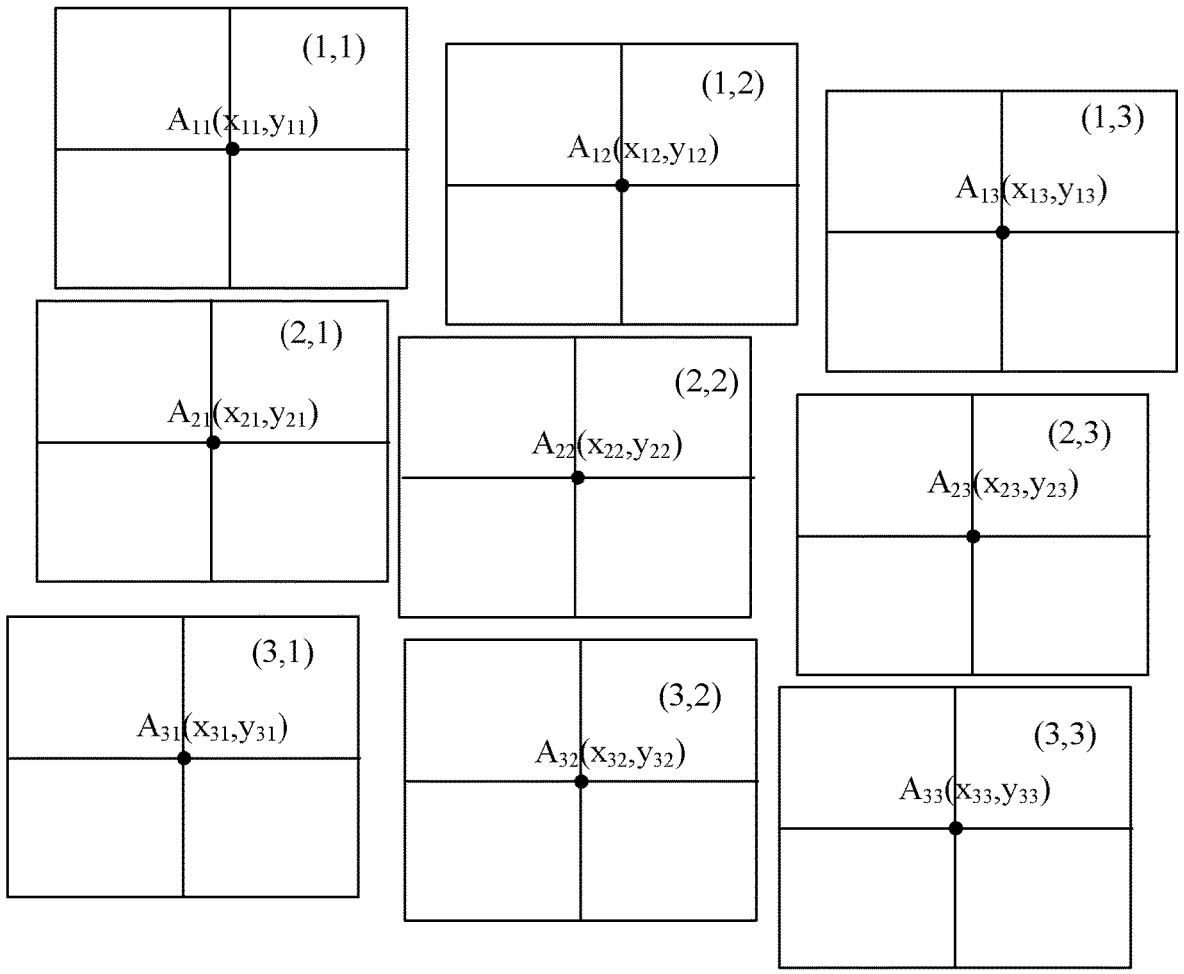
FIG. 2 is a schematic diagram for illustrating an example of determining the offset distance of the splicing screen according to some embodiments of the present disclosure.

FIG. 2 shows a schematic diagram for illustrating an example of determining the offset distance of the splicing screen according to some embodiments of the present disclosure. In this example as shown in FIG. 2, the multi-screen display system includes nine splicing screens arranged in a 3×3 matrix, which are represented by (1, 1), (1, 2), (1, 3), (2, 1), (2, 2), (2, 3), (3, 1), (3, 2), and (3, 3), respectively. In addition, the rectangular coordinate system is established for the multi-screen display system. In the rectangular coordinate system, the origin may be set, for example, at the lower left corner of the splicing screen (3, 1), X axis extends along the horizontal direction as shown, Y axis extends along the vertical direction as shown, and the unit length may be set related to a pixel size.

Firstly, the preset image may be displayed in each splicing screen. In this example, the preset image is a cross line pattern in which one line segment is parallel to a horizontal edge of the splicing screen, the other line segment is parallel to a vertical edge of the splicing screen, and the two line segments intersect at a midpoint.

Then, any point in the cross line pattern may be selected as the feature point. In this example, the intersection point A in the cross line pattern is determined as the feature point. Then, the coordinates of the feature point of each splicing screen may be determined. In this example, the image of the multi-screen display system may be captured by a camera, then the image may be analyzed to determine the coordinates of each feature point, i.e. $A_{11}$ ($x_{11}$, $y_{11}$), $A_{12}$ ($x_{12}$, $y_{12}$), $A_{13}$ ($x_{13}$, $y_{13}$), $A_{21}$ ($x_{21}$, $y_{21}$), $A_{22}$ ($x_{22}$, $y_{22}$), $A_{23}$ ($x_{23}$, $y_{23}$), $A_{31}$ ($x_{31}$, $y_{31}$), $A_{32}$ ($x_{32}$, $x_{33}$), and $A_{33}$ ($x_{33}$, $y_{33}$). Those skilled in the art will appreciate that any other method may be used to determine the positions of the feature points.

Then, based on the coordinates of the feature points, the vertical offset distance of each splicing screen may be determined. In some embodiments of the present disclosure, a first reference display screen may be selected from each row of the splicing screens. For each of the row of the splicing screens, a vertical offset of the position of the feature point of the splicing screen relative to the position of the feature point of the first reference display screen may be determined. Then, based on the vertical offset, a vertical pixel distance of the splicing screen relative to the first reference display screen may be determined as the vertical offset distance of the splicing screen.

In this example, for the first row of the splicing screens (1, 1), (1, 2), (1, 3), the splicing screen (1, 1) is selected as the reference display screen (corresponding to "the first reference display screen"). Then, according to the vertical coordinates $y_{11}$, $y_{12}$, and $y_{13}$ of the feature points $A_{11}$, $A_{12}$, and $A_{13}$ of the first row of the splicing screens (1, 1), (1, 2), (1, 3), it may be determined that the vertical offsets of the splicing screens (1, 1), (1, 2), (1, 3) relative to the reference display screen are the differences between the vertical coordinates, i.e., 0, $y_{12}-y_{11}$, and $y_{13}-y_{11}$, respectively. In this example, if the difference between the coordinates equals to zero, it indicates that the splicing screen has no offset relative to the reference display screen. If the difference between the coordinates is a positive value, it indicates that the splicing screen is offset upward relative to the reference display screen. If the difference between the coordinates is a negative value, it indicates that the splicing screen is offset downward relative to the reference display screen. Further, a vertical pixel distance may be determined as the vertical offset distance based on the vertical offset of the splicing screen. In some embodiments of the present disclosure, the vertical offset may be converted into the vertical pixel distance according to a relationship between the unit length of the coordinate system and the pixel size. For example, assuming that a ratio of the unit length of the coordinate system to the pixel size is k, it may be determined that the vertical pixel distances of the splicing screens (1, 1), (1, 2), and (1, 3) relative to the reference display screen are 0, k×($y_{12}-y_{11}$), and k×($y_{13}-y_{11}$), respectively, as the vertical offset distances of the splicing screens (1, 1), (1, 2), and (1, 3). Further, the vertical pixel distance may be rounded to facilitate subsequent image correction.

Similarly, for the second row of the splicing screens (2, 1), (2, 2), (2, 3), the splicing screen (2, 1) is selected as the reference display screen. Then, according to the vertical coordinates $y_{21}$, $y_{22}$, $y_{23}$ of the feature points $A_{21}$, $A_{22}$, $A_{23}$ of the second row of the splicing screens (2, 1), (2, 2), (2, 3), it may be determined that the vertical offsets of the splicing screens (2, 1), (2, 2), and (2, 3) relative to the reference display screen are 0, $y_{22}-y_{21}$ and $y_{23}-y_{21}$, respectively. Therefore, it may be determined that the vertical pixel distances of the splicing screens (2, 1), (2, 2), and (2, 3) relative to the reference display screen are 0, $k\times(y_{22}-y_{21})$, and $k\times(y_{23}-y_{21})$, respectively, as the vertical offset distances of the splicing screens (2, 1), (2, 2), and (2, 3).

Similarly, for the third row of the splicing screens (3, 1), (3, 2), (3, 3), the splicing screen (3, 1) is selected as the reference display screen. According to the vertical coordinates $y_{31}$, $y_{32}$, $y_{33}$ of the feature points $A_{31}$, $A_{32}$, $A_{33}$ of the splicing screens (3, 1), (3, 2), (3, 3), it may be determined that the vertical offsets of the splicing screens (3, 1), (3, 2), and (3, 3) relative to the reference display screen (3, 1) are 0, $y_{32}-y_{31}$ and $y_{33}-y_{31}$, respectively. Therefore, it may be determined that the vertical pixel distances of the splicing screens (3, 1), (3, 2), (3, 3) relative to the reference display screen are 0, $k\times(y_{32}-y_{31})$, and $k\times(y_{33}-y_{31})$, respectively, as the vertical offset distances of the splicing screens (3, 1), (3, 2), and (3, 3).

In other embodiments of the present disclosure, the vertical offset distance of each splicing screen may be determined by performing following operations. For each row of the splicing screens, the vertical offsets between the positions of the feature points of the adjacent splicing screens may be determined. Then, based on the vertical offsets, the vertical pixel distances between the adjacent splicing screens may be determined. Thus, the vertical pixel distance of each of the row of the splicing screens relative to the first reference display screen may be determined as the vertical offset distance, and the first reference display screen may be any splicing screen of the row of the splicing screens.

In the example shown in FIG. 2, for the first row of the splicing screens (1, 1), (1, 2), (1, 3), according to the vertical coordinates $y_{11}$, $y_{12}$, $y_{13}$ of the feature points $A_{11}$, $A_{12}$, $A_{13}$ of the splicing screens (1, 1), (1, 2), (1, 3), it may be determined that the vertical offset of the splicing screen (1, 2) relative to the splicing screen (1, 1) is $y_{12}-y_{11}$, and the vertical offset of the splicing screen (1, 3) relative to the splicing screen (1, 2) is $y_{13}-y_{12}$. Then, it may be determined that the vertical pixel distance of the splicing screen (1, 2) relative to the splicing screen (1, 1) is $k\times(y_{12}-y_{11})$, and the vertical pixel distance of the splicing screen (1, 3) relative to the splicing screen (1, 2) is $k\times(y_{13}-y_{12})$. Furthermore, the splicing screen (1, 1) may be selected as the reference display screen (corresponding to "the first reference display screen"). Then, it is determined that the vertical pixel distances of the splicing screens (1, 1), (1, 2), (1, 3) relative to the reference display screen are 0, $k\times(y_{12}-y_{11})$, and $k\times(y_{13}-y_{12})-k\times(y_{12}-y_{11})=k\times(y_{13}-y_{12})$, respectively, as the vertical offset distances of the splicing screens (1, 1), (1, 2), (1, 3).

Similarly, for the second row of the splicing screens (2, 1), (2, 2), (2, 3), if the splicing screen (2, 1) is selected as the reference display screen, it may be determined that the vertical pixel distances of the splicing screens (2, 1), (2, 2), (2, 3) relative to the reference display screen are 0, $k\times(y_{22}-y_{21})$ and $k\times(y_{23}-y_{22})-k\times(y_{22}-y_{21})=k\times(y_{23}-y_{21})$, respectively, as the vertical offset distances of the splicing screens (2, 1), (2, 2), (2, 3).

Similarly, for the third row of the splicing screens (3, 1), (3, 2), (3, 3), if the splicing screen (3, 1) is selected as the reference display screen, it may be determined that the vertical pixel distances of the splicing screens (3, 1), (3, 2), (3, 3) relative to the reference display screen are 0, $k\times(y_{32}-y_{31})$, and $k\times(y_{33}-y_{32})-k\times(y_{32}-y_{31})=k\times(y_{33}-y_{31})$, respectively, as the vertical offset distances of the splicing screens (3, 1), (3, 2), (3, 3).

Additionally or alternatively, based on the coordinates of the feature points, the horizontal offset distance of each splicing screen may be determined. In some embodiments of the present disclosure, a second reference display screen may be selected from each column of the splicing screens. Then, for each of the column of the splicing screens, a horizontal offset of the position of the feature point of the splicing screen relative to the position of the feature point of the second reference display screen may be determined. Then, based on the horizontal offset, a horizontal pixel distance of the splicing screen relative to the second reference display screen may be determined as the horizontal offset distance of the splicing screen.

In this example, for the first column of the splicing screens (1, 1), (2, 1), (3, 1), the splicing screen (1, 1) may be selected as the reference display screen (corresponding to "the second reference display screen"). According to the horizontal coordinates $x_{11}$, $x_{21}$, $x_{31}$ of the feature points $A_{11}$, $A_{21}$, $A_{31}$ of the splicing screens (1, 1), (2, 1), (3, 1), it may be determined that the horizontal offsets of the splicing screens (1, 1), (2, 1), and (3, 1) relative to the reference display screen are the differences between the horizontal coordinates, i.e., 0, $x_{21}-x_{11}$, and $x_{31}-x_{11}$. In this example, if the difference between the horizontal coordinates equals to zero, it indicates that the splicing screen has no offset relative to the reference display screen. If the difference between the horizontal coordinates is a positive value, it indicates that the splicing screen is offset rightward relative to the reference display screen. If the difference between the horizontal coordinates is a negative value, it indicates that the splicing screen is offset leftward relative to the reference display screen. Then, according to the relationship between the unit length of the coordinate system and the pixel size, it may be determined that the horizontal pixel distances of the splicing screens (1, 1), (2, 1), and (3, 1) relative to the reference display screen are 0, $k\times(x_{21}-x_{11})$, and $k\times(x_{31}-x_{11})$, respectively, as the horizontal offset distances of the splicing screens (1, 1), (2, 1), and (3, 1).

Similarly, for the second column of the splicing screens (1, 2), (2, 2), (3, 2), if the splicing screen (1, 2) is selected as the reference display screen, it may be determined that the horizontal offsets of the splicing screens (1, 2), (2, 2), and (2, 3) relative to the reference display screen are 0, $x_{22}-x_{12}$, and $x_{32}-x_{12}$, respectively. Then, it may be determined that the horizontal pixel distances of the splicing screens (1, 2), (2, 2), (3, 2) relative to the reference display screen are 0, $k\times(x_{22}-x_{12})$, and $k\times(x_{32}-x_{12})$, respectively, as the horizontal offset distances of the splicing screens (1, 2), (2, 2), (3, 2).

Similarly, for the third column of the splicing screens (1, 3), (2, 3), (3, 3), if the splicing screen (1, 3) is selected as the reference display screen, it may be determined that the horizontal offsets of the splicing screens (1, 3), (2, 3), and (3, 3) relative to the reference display screen are 0, $x_{23}-x_{13}$, and $x_{33}-x_{13}$, respectively. Then, it may be determined that the horizontal pixel distances of the splicing screens (1, 3), (2, 3), (3, 3) relative to the reference display screen are 0, $k\times(x_{23}-x_{13})$, and $k\times(x_{33}-x_{13})$, respectively, as the horizontal offset distances of the splicing screens (1, 3), (2, 3), (3, 3).

In other embodiments of the present disclosure, the horizontal offset distance of each splicing screen may be determined by performing following operations. For each column of the splicing screens, the horizontal offsets between the positions of the corresponding feature points of the adjacent splicing screens may be determined. Then, the horizontal pixel distances between the adjacent splicing screens may be determined based on the horizontal offsets. Then, the horizontal pixel distance of each of the column of the splicing screens relative to a second reference display screen may be determined as the horizontal offset distance, and the second reference display screen may be any splicing screen of the column of the splicing screens.

In the example shown in FIG. 2, for the first column of the splicing screens (1, 1), (2, 1), (3, 1), according to the horizontal coordinates $x_{11}$, $x_{21}$, $x_{31}$ of the feature points $A_{11}$, $A_{21}$, $A_{31}$ of the splicing screens (1, 1), (2, 1), (3, 1), it may be determined that the horizontal offset of the splicing screen (2, 1) relative to the splicing screen (1, 1) is $x_{21}-x_{11}$, and the horizontal offset of the splicing screen (3, 1) relative to the splicing screen (2, 1) is $y_{31}-y_{21}$. Then, it may be determined that the horizontal pixel distance of the splicing screen (2, 1) relative to the splicing screen (1, 1) is $k\times(x_{21}-x_{11})$, and the horizontal pixel distance of the splicing screen (3, 1) relative to the splicing screen (2, 1) is $k\times(x_{31}-x_{21})$. Further, the splicing screen (1, 1) is selected as the reference display screen (corresponding to "the second reference display screen"), and the horizontal pixel distances of the splicing screens (1, 1), (2, 1), (3, 1) relative to the reference display screen are 0, $k\times(x_{21}-x_{11})$, and $k\times(x_{31}-x_{21})-k\times(x_{21}-x_{11})=k\times(x_{31}-x_{11})$, respectively, as the horizontal offset distances of the splicing screens (1, 1), (2, 1), (3, 1).

Similarly, for the second column of splicing screens (1, 2), (2, 2), (3, 2), if the splicing screen (1, 2) is selected as the reference display screen, it may be determined that the horizontal pixel distances of the splicing screens (1, 2), (2, 2), (3, 2) relative to the reference display screen are 0, $k\times(x_{22}-x_{12})$, and $k\times(x_{32}-x_{22})-k\times(x_{22}-x_{12})=k\times(x_{32}-x_{12})$, respectively, as the horizontal offset distances of the splicing screens (1, 2), (2, 2), (3, 2).

Similarly, for the third column of the splicing screens (1, 3), (2, 3), (3, 3), if the splicing screen (1, 3) is selected as the reference display screen, it may be determined that the horizontal pixel distances of the splicing screens (1, 3), (2, 3), (3, 3) relative to the reference display screen are 0, $k\times(x_{23}-x_{13})$, and $k\times(x_{23}-x_{13})-k\times(x_{23}-x_{13})=k\times(x_{33}-x_{13})$, respectively, as the horizontal offset distances of the splicing screens (1, 3), (2, 3), (3, 3).

Although in the description of the examples, the first splicing screen (1, 1), (2, 1), (3, 1) of each row of the splicing screens is selected as the first reference display screen, and the first splicing screen (1, 1), (1, 2), (1, 3) of each column of the splicing screens is selected as the second reference display screen, those skilled in the art will appreciate that any splicing screen of each row of the splicing screens may be selected as the first reference display screen, and any splicing screen of each column of the splicing screens may be selected as the second reference display screen.

Alternatively, in the above examples, any point in the horizontal line segment and any point in the vertical line segment of the cross line pattern may be selected as the feature point. For the convenience of explanation, the feature point in the horizontal line segment may be referred to as "the first feature point", and the feature point in the vertical line segment may be referred to as "the second feature point". The vertical coordinate of the first feature point of each splicing screen may be determined, and the horizontal coordinate of the second feature point of each splicing screen may be determined. Additionally or alternatively, the vertical offset distance and/or the horizontal offset distance of each splicing screen may be determined respectively according to the vertical coordinates of the first feature points and the horizontal coordinates of the second feature points. The process of determining the vertical offset distances and the process of determining the horizontal offset distances have been described above and will be omitted appropriately herein.

Figure 3A:
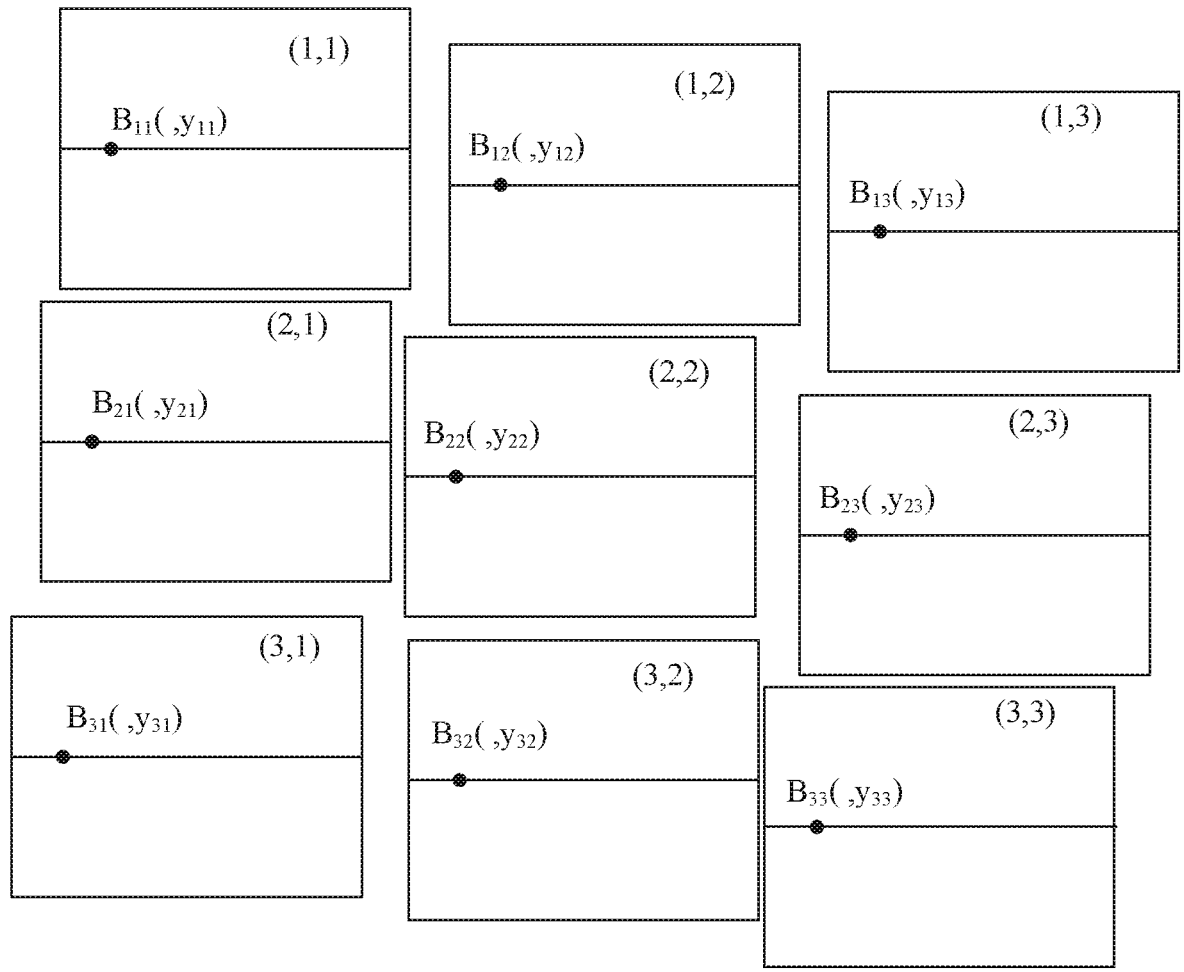
FIGS. 3A and 3B are schematic diagrams for illustrating another example of determining the offset distance of the splicing screen according to some embodiments of the present disclosure.
Figure 3B:
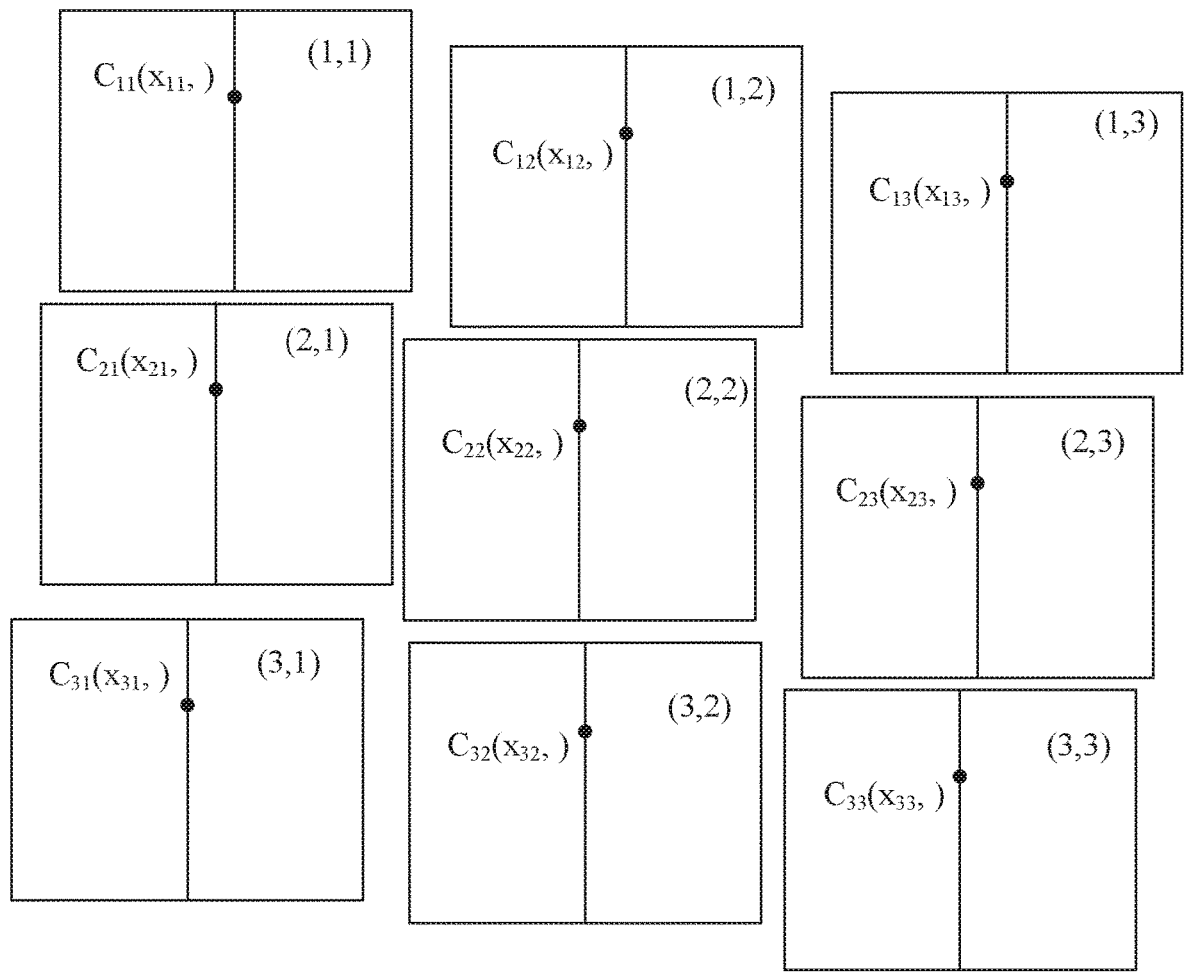

FIGS. 3A and 3B respectively show the schematic diagrams for illustrating another example of determining the offset distance of the splicing screen according to some embodiments of the present disclosure. In this example, the first preset image and/or the second preset image are respectively displayed in each splicing screen. The vertical offset distance of each splicing screen may be determined according to the position of the first feature point in the first preset image. Additionally or alternatively, the horizontal offset distance of each splicing screen may be determined according to the position of the second feature point in the second preset image.

As shown in FIG. 3A, the first preset image is displayed in each splicing screen. In this example, the first preset image is a horizontal line pattern, and the horizontal line is located in the middle of each splicing screen and is parallel to the horizontal edge of the splicing screen. Then, any point in the horizontal line pattern may be selected as the first feature point. In this example, the point B is selected as the first feature point. Then, the vertical coordinate of the first feature point B of each splicing screen may be determined, i.e., the vertical coordinates $y_{11}$, $y_{12}$, $y_{13}$, $y_{21}$, $y_{22}$, $y_{23}$, $y_{31}$, $y_{32}$, $y_{33}$ of the first feature points $B_{11}$, $B_{12}$, $B_{13}$, $B_{21}$, $B_{22}$, $B_{23}$, $B_{31}$, $B_{32}$, $B_{33}$.

Then, based on the coordinates of each first feature point, the vertical offset distance of each splicing screen may be determined. In this example, according to the vertical coordinates $y_{11}$, $y_{12}$, $y_{13}$, $y_{21}$, $y_{22}$, $y_{23}$, $y_{31}$, $y_{32}$, $y_{33}$ of the first feature points $B_{11}$, $B_{12}$, $B_{13}$, $B_{21}$, $B_{22}$, $B_{23}$, $B_{31}$, $B_{32}$, $B_{33}$, the vertical offset of the splicing screen may be determined as the difference between the vertical coordinates. Then, according to the relationship between the unit length of the coordinate system and the pixel size, the vertical offset of each splicing screen may be converted into the vertical pixel distance as the vertical offset distance.

Additionally or alternatively, as shown in FIG. 3B, the second preset image is displayed in each splicing screen. In this example, the second preset image is a vertical line pattern, and the vertical line is located in the middle of each splicing screen and is parallel to the vertical edge of the splicing screen. Then, any point in the vertical line pattern may be selected as the second feature point. In this example, the point C is selected as the second feature point. Then, the horizontal coordinate of the second feature point of each splicing screen may be determined, i.e., the horizontal coordinates $x_{11}$, $x_{12}$, $x_{13}$, $x_{21}$, $x_{22}$, $x_{23}$, $x_{31}$, $x_{32}$, and $x_{33}$ of the second feature points $C_{11}$, $C_{12}$, $C_{13}$, $C_{21}$, $C_{22}$, $C_{23}$, $C_{31}$, $C_{32}$, and $C_{33}$.

Then, based on the coordinates of the second feature points, the horizontal offset distance for each splicing screen may be determined. In this example, according to the horizontal coordinates $x_{11}$, $x_{12}$, $x_{13}$, $x_{21}$, $x_{22}$, $x_{23}$, $x_{31}$, $x_{32}$, $x_{33}$ of the second feature points $C_{11}$, $C_{12}$, $C_{13}$, $C_{21}$, $C_{22}$, $C_{23}$, $C_{31}$, $C_{32}$, $C_{33}$, the horizontal offset of the splicing screen may be determined as the difference between the horizontal coordinates. Then, according to the relationship between the unit length of the coordinate system and the pixel size, the horizontal offset of each splicing screen may be converted into the horizontal pixel distance as the horizontal offset distance.

In addition, although the first preset image is the horizontal line pattern and the second preset image is the vertical line pattern in the above description, those skilled in the art will appreciate that in some embodiments of the present disclosure, the first preset image and the second preset image may also be other images.

It can be therefore seen from the above description that, with the method for determining the offset distance of the splicing screen according to the embodiments of the present disclosure, the vertical offset distance and/or the horizontal offset distance of each splicing screen can be determined for the physically spliced multi-screen display system, so as to provide a basis for correcting the image display of the multi-screen display system.

Figure 4:
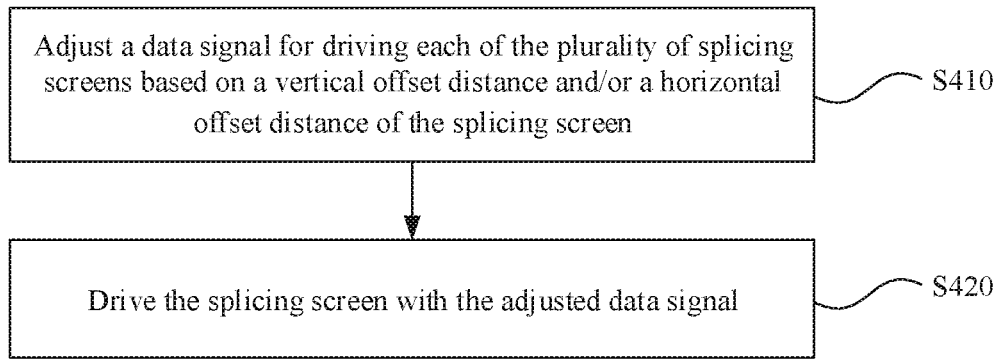
FIG. 4 is a schematic flow chart of a method for driving the multi-screen display system according to some embodiments of the present disclosure.

FIG. 4 shows a schematic flow chart of a method for driving the multi-screen display system according to some embodiments of the present disclosure.

As shown in FIG. 4, at step S410, a data signal for driving each splicing screen is adjusted based on the vertical offset distance and/or the horizontal offset distance of each splicing screen. In some embodiments of the present disclosure, the vertical offset distance and/or the horizontal offset distance of each splicing screen may be determined according to the methods as described in reference to FIGS. 1-3. At step S420, the splicing screen is driven using the adjusted data signal.

In some embodiments of the present disclosure, the data signal for driving each splicing screen may be adjusted based on the vertical offset distance of the splicing screen. In the multi-screen display system as shown in FIG. 2 for example, for each splicing screen (1, 1), (1, 2), (1, 3), (2, 1), (2, 2), (2, 3), (3, 1), (3, 2), and (3, 3), the data signal for driving each splicing screen may be adjusted according to the determined vertical offset distance of the splicing screen, so that the image can be displayed in the splicing screen with no offset in the horizontal direction.

Additionally or alternatively, the data signal for driving each splicing screen may be adjusted based on the horizontal offset distance of the splicing screen. In the multi-screen display system as shown in FIG. 2 for example, for each splicing screen (1, 1), (1, 2), (1, 3), (2, 1), (2, 2), (2, 3), (3, 1), (3, 2), and (3, 3), the data signal for driving each splicing screen may be adjusted based on the determined horizontal offset distance of the splicing screen, so that the image can be displayed in the splicing screen with no offset in the vertical direction.

Then the adjusted data signal is output to the corresponding splicing screen to drive the splicing screen to display the image.

Figure 5A:
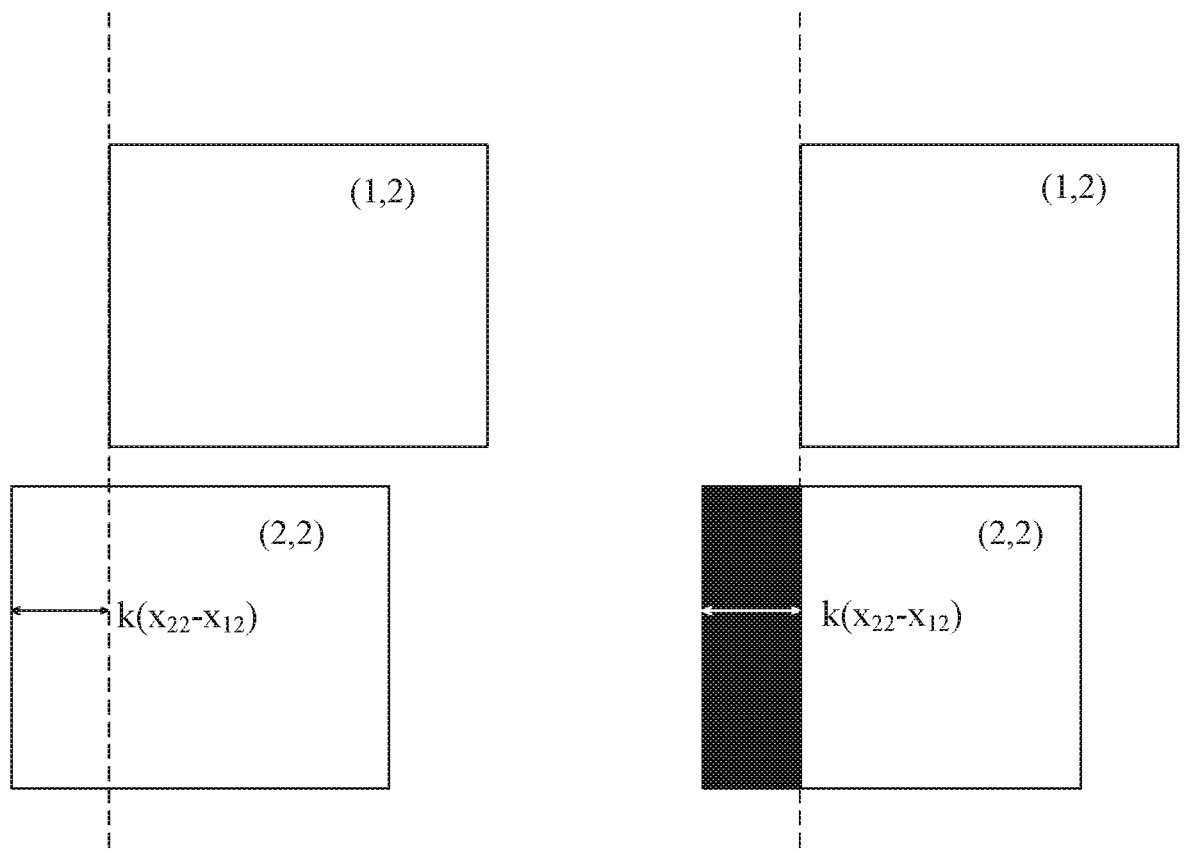
FIGS. 5A and 5B are exemplary diagrams for illustrating the processing of vertical offsets and horizontal offsets of the splicing screens.
Figure 5B:
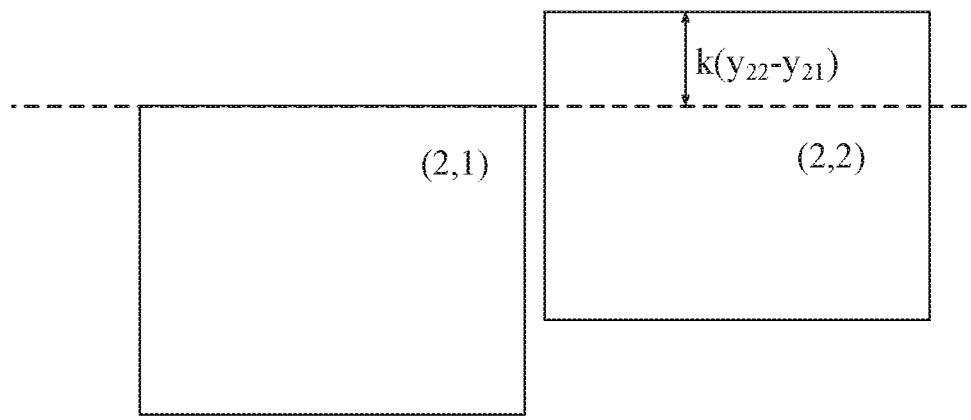
Figure 5B:
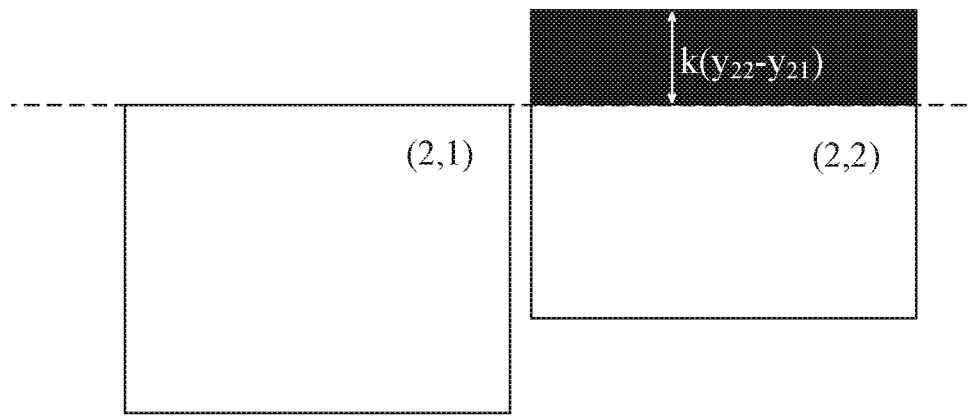

Further, in other embodiments of the present disclosure, a number of pixel rows or pixel columns of each splicing screen may be displayed in black according to the determined vertical offset distance and/or horizontal offset distance of the splicing screen. FIGS. 5A and 5B show the schematic diagrams for illustrating the processing, and the splicing screen (2, 2) of the multi-screen display system shown in FIG. 2 is taken as an example for the explanation.

As shown in FIG. 5A, for the splicing screen (2, 2), it may be determined that the number of the offset pixel rows is $k \times (y_{22} - y_{21})$. In this example, if the vertical offset distance equals to zero, it indicates that there is no offset pixel row. If the vertical offset distance is positive, it indicates that the offset pixel row(s) is at the top edge of the splicing screen. If the vertical offset distance is negative, it indicates that the offset pixel row(s) is at the bottom edge of the splicing screen. Then, when an image is displayed, the offset pixel row(s) is displayed in black.

Similarly, for other splicing screens (1, 1), (1, 2), (1, 3), (2, 1), (2, 3), (3, 1), (3, 2), (3, 3), the corresponding offset pixel row(s) may be determined and the offset pixel row(s) is displayed in black.

Additionally or alternatively, as shown in FIG. 5B, for the splicing screen (2, 2), it may be determined that the number of the offset pixel columns is $k \times (x_{22} - x_{12})$. If the horizontal offset distance equals to zero, it indicates that there is no offset pixel column. If the horizontal offset distance is positive, it indicates that the offset pixel column(s) is at the right edge of the splicing screen. If the horizontal offset distance is negative, it indicates that the offset pixel column(s) is at the left edge of the splicing screen. Then, when an image is displayed, the offset pixel column(s) is displayed in black.

Similarly, for other splicing screens (1, 1), (1, 2), (1, 3), (2, 1), (2, 3), (3, 1), (3, 2), (3, 3), the offset pixel column(s) may be determined and the offset pixel column(s) is displayed in black.

Figure 6:
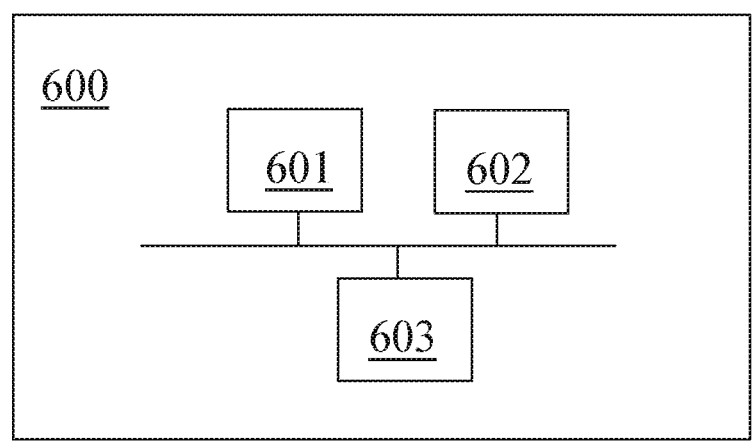
FIG. 6 is a schematic block diagram of a control apparatus for the multi-screen display system according to some embodiments of the present disclosure.

FIG. 6 shows a schematic block diagram of the control apparatus 600 for the multi-screen display system according to some embodiments of the present disclosure. As shown in FIG. 6, the control apparatus 600 may include a processor 601 and a memory 602. The memory 602 is coupled to the processor 601 and stores computer program instructions. When the computer program instructions are executed by the processor 601, the control apparatus 600 may determine the offset distance for each splicing screen in the multi-screen display system by performing the methods as previously described in reference to FIGS. 1-3. The control apparatus 600 may also include an input/output device 603 which may be coupled to processor 601 and memory 602 via a bus.

Further, the control apparatus 600 may adjust the data signal for driving each splicing screen according to the determined offset distance of the splicing screen, and drive the splicing screen using the adjusted data signal.

Figure 7:
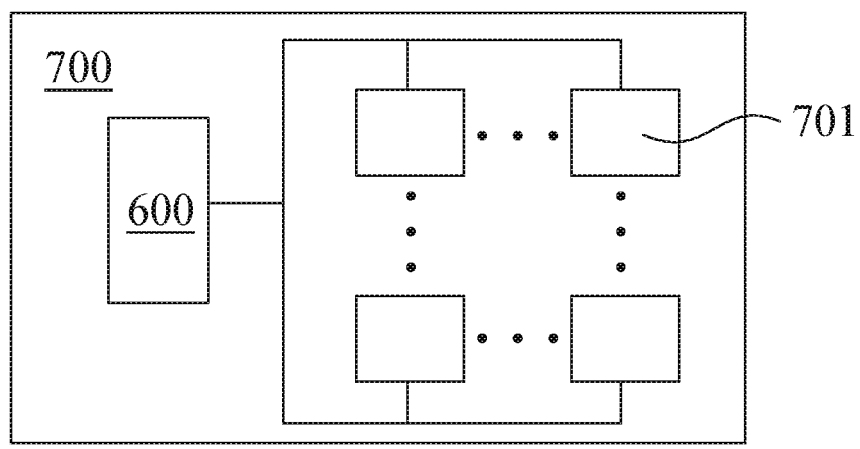
FIG. 7 is a schematic block diagram of the multi-screen display system according to some embodiments of the present disclosure.

FIG. 7 shows a schematic block diagram of the multi-screen display system 700 according to some embodiments of the present disclosure. As shown in FIG. 7, the multi-screen display system 700 may include a plurality of splicing screens 701 arranged in a matrix and the control apparatus 600 as shown in FIG. 6. The control apparatus 600 may be coupled to each of the plurality of splicing screen 701s.

With the multi-screen display system 700 of the embodiment, the image can be displayed on the splicing screens in the multi-screen display system with no offset, even if it is the high-speed motion image.

Some embodiments of the present disclosure have been described above in detail, but they are presented by way of example only and are not intended to limit the scope of the disclosure. In fact, the embodiments described herein may be implemented in various other forms. In addition, various omissions, replacements, and modifications to the embodiments described herein may be made without departing from the spirit of the present disclosure. The appended claims and their equivalents are intended to cover such forms or modifications that fall within the scope and spirit of the present disclosure.

What is claimed is:

1. A method for determining an offset distance of a splicing screen in a multi-screen display system, the multi-screen display system comprising a plurality of splicing screens arranged in a matrix, the method comprising:

displaying a preset image in each of the plurality of splicing screens;

determining a feature point in the preset image;
determining, for each splicing screen, a position of the feature point in the multi-screen display system; and
determining, for each splicing screen, at least one of a vertical offset distance and a horizontal offset distance based on the positions of the feature points;
wherein A) determining the vertical offset distance for each splicing screen based on the positions of the feature points comprises:
selecting a first reference display screen from each row of the splicing screens;
determining, for each of the row of the splicing screens, a vertical offset of the position of the feature point of the splicing screen relative to the position of the feature point of the first reference display screen; and
determining, based on the vertical offset, a vertical pixel distance of the splicing screen relative to the first reference display screen as the vertical offset distance; or
wherein B) determining the vertical offset distance for each splicing screen based on the positions of the feature points comprises:
determining, for each row of the splicing screens, vertical offsets between the positions of the feature points of adjacent splicing screens;
determining vertical pixel distances between the adjacent splicing screens based on the vertical offsets; and
determining the vertical pixel distance of each row of the splicing screens relative to a first reference display screen as the vertical offset distance, based on the vertical pixel distances between the adjacent splicing screens, wherein the first reference display screen is one of the row of the splicing screens.

2. The method according to claim 1, wherein in the case of A), the vertical offset is determined by calculating a difference between a vertical coordinate of each feature point of each row of the splicing screens and a vertical coordinate of the feature point of the corresponding first reference display screen.

3. The method according to claim 1, wherein determining the horizontal offset distance for each splicing screen based on the positions of the feature points comprises:
selecting a second reference display screen from each column of the splicing screens;
determining, for each of the column of the splicing screens, a horizontal offset of the position of the feature point of the splicing screen relative to the position of the feature point of the second reference display screen; and
determining, based on the horizontal offset, a horizontal pixel distance of the splicing screen relative to the second reference display screen as the horizontal offset distance.

4. The method according to claim 3, wherein the horizontal offset is determined by calculating a difference between a horizontal coordinate of each feature point of each column of the splicing screens and a horizontal coordinate of the feature point of the corresponding second reference display screen.

5. The method according to claim 1, wherein in the case of B), the vertical offset is determined by calculating a difference between vertical coordinates of the feature points of the adjacent splicing screens.

6. The method according to claim 1, wherein determining the horizontal offset distance for each splicing screen based on the positions of the feature points comprises:
determining, for each column of the splicing screens, horizontal offsets between the positions of the feature points of the adjacent splicing screens;
determining horizontal pixel distances between the adjacent splicing screens based on the horizontal offsets; and
determining the horizontal pixel distance of each of the column of the splicing screens relative to a second reference display screen as the horizontal offset distance, based on the horizontal pixel distances between the adjacent splicing screens, wherein the second reference display screen is one of the column of the splicing screens.

7. The method according to claim 6, wherein the horizontal offset is determined by calculating a difference between horizontal coordinates of the feature points of the adjacent splicing screens.

8. The method according to claim 1, wherein the preset image is one of the following images: a cross line pattern formed by intersection of line segments which are parallel to two adjacent edges of the splicing screen respectively; a first line pattern in parallel with a row direction of the matrix of the splicing screens; and a second line pattern in parallel with a column direction of the matrix of the splicing screens.

9. The method according to claim 1, wherein the preset images include a first preset image and a second preset image,
wherein a first feature point is determined in the first preset image to determine the vertical offset distances of the splicing screens, and wherein a second feature point is determined in the second preset image to determine the horizontal offset distances of the splicing screens.

10. The method according to claim 9, wherein the first preset image is a first line pattern parallel to a row direction of the matrix of the splicing screens, and wherein the second preset image is a second line pattern parallel to a column direction of the matrix of the splicing screens.

11. A method for driving a multi-screen display system, the multi-screen display system comprising a plurality of splicing screens arranged in a matrix, the method comprising:
adjusting a data signal for driving each of the plurality of splicing screens based on a vertical offset distance and/or a horizontal offset distance of the splicing screen, wherein the vertical offset distance and/or the horizontal offset distance are determined using the method according to claim 1; and
driving the splicing screen with the adjusted data signal.

12. The method according to claim 11, further comprising:
causing, for each of the splicing screens, a number of pixel rows corresponding to the vertical offset distance to display in black based on the vertical offset distance, wherein the pixel rows are located at an edge of the splicing screen in a same direction as an offset direction of the vertical offset distance; and/or
causing, for each of the splicing screens, a number of pixel columns corresponding to the horizontal offset distance to display in black based on the horizontal offset distance, wherein the pixel columns are located at an edge of the splicing screen in a same direction as an offset direction of the horizontal offset distance.

13. The method according to claim 11, wherein determining the horizontal offset distance for each splicing screen based on the positions of the feature points comprises:

determining, for each column of the splicing screens, horizontal offsets between the positions of the feature points of the adjacent splicing screens;

determining horizontal pixel distances between the adjacent splicing screens based on the horizontal offsets; and determining the horizontal pixel distance of each column of the splicing screens relative to a second reference display screen as the horizontal offset distance, based on the horizontal pixel distances between the adjacent splicing screens, wherein the second reference display screen is one of the column of the splicing screens.

14. The method according to claim 11, wherein determining the horizontal offset distance for each splicing screen based on the positions of the feature points comprises:

selecting a second reference display screen from each column of the splicing screens;

determining, for each column of the splicing screens, a horizontal offset of the position of the feature point of the splicing screen relative to the position of the feature point of the second reference display screen; and determining, based on the horizontal offset, a horizontal pixel distance of the splicing screen relative to the second reference display screen as the horizontal offset distance.

15. A control apparatus for a multi-screen display system, the multi-screen display system comprising a plurality of splicing screens arranged in a matrix, the control apparatus comprising:

one or more processors; and a memory coupled to the one or more processors and having computer program instructions stored therein, wherein the computer program instructions are configured to, when executed by the one or more processors, cause the control apparatus to perform the method according to claim 1 to determine a vertical offset distance and/or a horizontal offset distance for each of the splicing screens.

16. The control apparatus according to claim 15, wherein the computer program instructions are further configured to, when executed by the one or more processors, cause the control apparatus to:

adjust a data signal for driving each of the splicing screens based on the vertical offset distance and/or the horizontal offset distance of the splicing screen; and driving the splicing screen with the adjusted data signal.

17. A multi-screen display system comprising:

a plurality of splicing screens arranged in a matrix; and the control apparatus according to claim 15, coupled to the plurality of splicing screens.

18. The multi-screen display system according to claim 17, wherein the control apparatus is further configured to:

adjust a data signal for driving each of the splicing screens based on the vertical offset distance and/or the horizontal offset distance of the splicing screen; and driving the splicing screen with the adjusted data signal.

* * * * *

UNITED STATES PATENT AND TRADEMARK OFFICE
CERTIFICATE OF CORRECTION

PATENT NO. : 11,397,551 B2
APPLICATION NO. : 16/612548
DATED : July 26, 2022
INVENTOR(S) : Xitong Ma et al.

It is certified that error appears in the above-identified patent and that said Letters Patent is hereby corrected as shown below:

In the Specification

Column 7, Line 52, delete "$k \times (y_{13}-y_{12})-k \times (y_{12}-y_{11})=k \times (y_{13}-y_{12})$" and insert therefor
-- $k \times (y_{13}-y_{12})-k \times (y_{12}-y_{11})=k \times (y_{13}-y_{11})$ --.

Signed and Sealed this
Eleventh Day of July, 2023

Katherine Kelly Vidal
*Director of the United States Patent and Trademark Office*